United States Patent
Becker et al.

(10) Patent No.: US 9,956,596 B2
(45) Date of Patent: May 1, 2018

(54) METHOD AND DEVICE FOR PRODUCING A SLIDING RAIL OF A LONGITUDINAL ADJUSTMENT DEVICE OF A VEHICLE SEAT

(75) Inventors: Burckhard Becker, Solingen (DE); Peter Fuchs, Dinslaken (DE); Thomas Gittermann, Wermelskirchen (DE); Harald Schmidt, Langerwehe (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 810 days.

(21) Appl. No.: 13/989,006

(22) PCT Filed: Oct. 28, 2011

(86) PCT No.: PCT/EP2011/069012
§ 371 (c)(1),
(2), (4) Date: Jul. 17, 2013

(87) PCT Pub. No.: WO2012/069277
PCT Pub. Date: May 31, 2012

(65) Prior Publication Data
US 2013/0287965 A1  Oct. 31, 2013

(30) Foreign Application Priority Data
Nov. 23, 2010 (DE) .................. 10 2010 061 800

(51) Int. Cl.
*B08B 7/00* (2006.01)
*B60N 2/07* (2006.01)
(Continued)

(52) U.S. Cl.
CPC .............. *B08B 7/0042* (2013.01); *B05D 3/06* (2013.01); *B23K 26/032* (2013.01);
(Continued)

(58) Field of Classification Search
CPC ..................... B60R 11/2011; B60R 11/0012
(Continued)

(56) References Cited

U.S. PATENT DOCUMENTS

| 4,304,978 A | 12/1981 | Saunders |
| 4,787,756 A * | 11/1988 | Pilarski ............... B60N 2/0705 384/47 |

(Continued)

FOREIGN PATENT DOCUMENTS

| CN | 101143364 A1 | 3/2001 |
| DE | 31 43 431 A1 | 5/1983 |

(Continued)

OTHER PUBLICATIONS

DE 102008009704 A1 machine translation.*
(Continued)

*Primary Examiner* — Dah-Wei D. Yuan
*Assistant Examiner* — Jose Hernandez-Diaz
(74) *Attorney, Agent, or Firm* — Foley & Lardner LLP

(57) ABSTRACT

A method is provided for producing a sliding rail of a longitudinal adjustment device for a vehicle seat, in which the longitudinal adjustment device has at least one pair of rails having two sliding rails and having sliding and/or rolling elements, the two sliding rails can be moved in the longitudinal direction against one another, the sliding and/or rolling elements are disposed between the sliding rails, and the sliding rails have contact tracks by which the sliding and/or rolling elements are in contact. A sliding rail is produced and then painted. Subsequently, at least one contact track is irradiated with a laser. In this way the layer of paint located on the contact track is removed.

10 Claims, 5 Drawing Sheets

Figure 1:
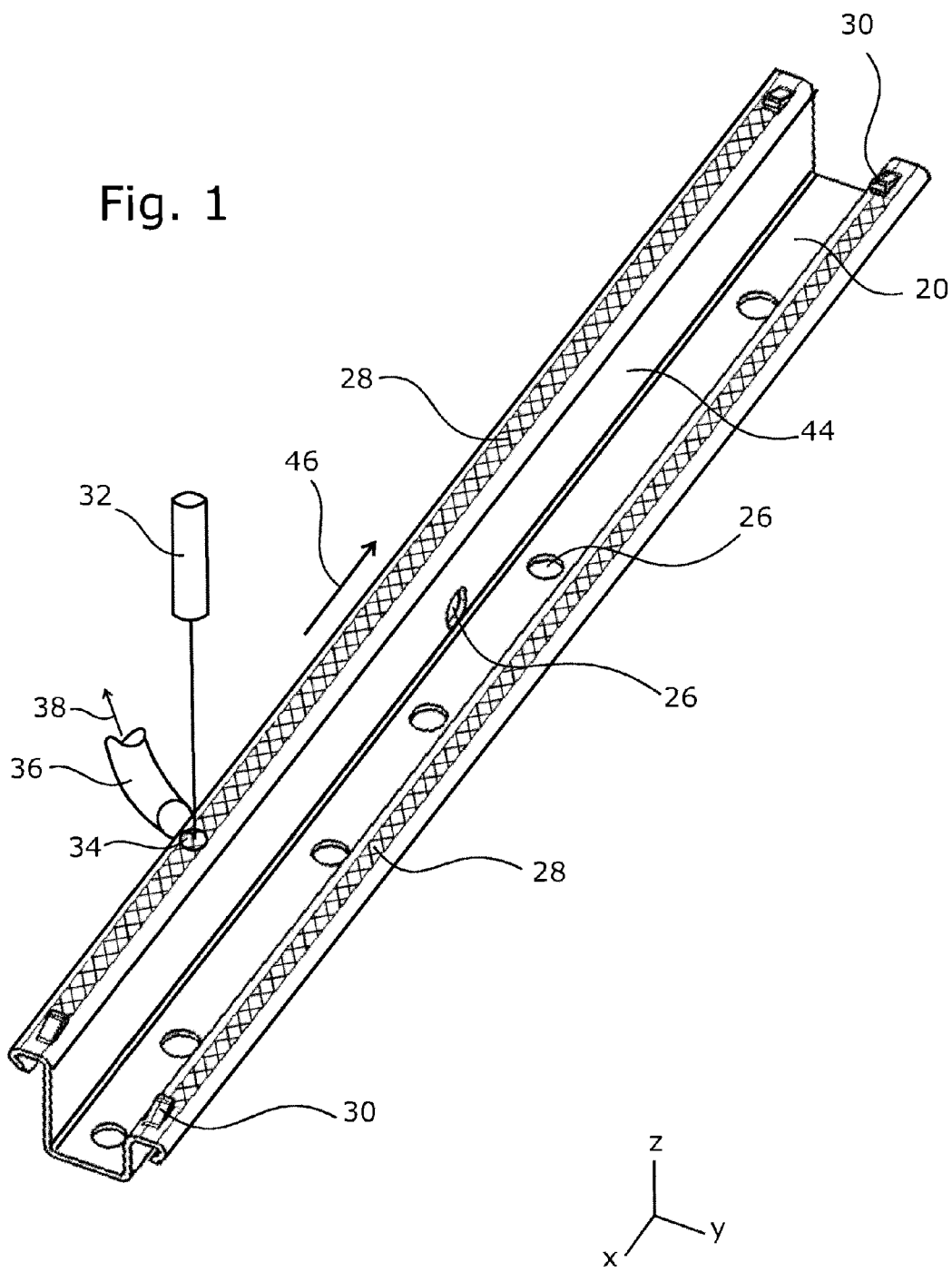

(51) Int. Cl.
    B23K 26/073    (2006.01)
    B23K 26/03     (2006.01)
    B23K 26/08     (2014.01)
    C21D 1/09      (2006.01)
    C21D 9/00      (2006.01)
    B05D 3/06      (2006.01)
    B23K 26/364    (2014.01)
    B23K 26/40     (2014.01)
    B23K 101/00    (2006.01)
    B23K 101/34    (2006.01)
    B23K 103/04    (2006.01)
    B23K 103/16    (2006.01)
    B23K 103/00    (2006.01)

(52) U.S. Cl.
    CPC ...... *B23K 26/0736* (2013.01); *B23K 26/0869*
        (2013.01); *B23K 26/364* (2015.10); *B23K
        26/40* (2013.01); *B60N 2/0722* (2013.01);
        *C21D 1/09* (2013.01); *C21D 9/0068*
        (2013.01); *B23K 2201/006* (2013.01); *B23K
        2201/34* (2013.01); *B23K 2203/04* (2013.01);
        *B23K 2203/172* (2015.10); *B23K 2203/50*
        (2015.10); *C21D 2221/00* (2013.01)

(58) Field of Classification Search
    USPC ..... 427/554; 118/620; 296/63, 65.01, 65.02,
                                    296/65.13–65.15; 134/1, 2
    See application file for complete search history.

(56) References Cited

U.S. PATENT DOCUMENTS

| | | | |
|---|---|---|---|
| 4,863,289 A | 9/1989 | Lecerf | |
| 5,252,959 A * | 10/1993 | Kono | G09G 3/3611 345/694 |
| 5,281,798 A * | 1/1994 | Hamm | B08B 7/0035 219/121.62 |
| 5,588,750 A * | 12/1996 | Osawa | F16C 29/0647 384/15 |
| 5,855,350 A * | 1/1999 | Volker | B60N 2/0705 248/430 |
| 6,059,248 A | 5/2000 | Bauer et al. | |
| 6,772,041 B2 | 8/2004 | Inoue et al. | |
| 6,797,918 B1 * | 9/2004 | Higgins | B08B 7/0042 219/121.68 |
| 2003/0206669 A1 * | 11/2003 | Smith | B60N 2/071 384/47 |
| 2004/0003874 A1 | 1/2004 | Yoshii | |

FOREIGN PATENT DOCUMENTS

| | | | |
|---|---|---|---|
| DE | 195 21 566 A1 | 1/1997 | |
| DE | 692 23 258 T2 | 10/1998 | |
| DE | 198 12 045 A1 | 9/1999 | |
| DE | 100 14 154 C1 | 6/2001 | |
| DE | 1020040 61 140 | 1/2006 | |
| DE | 1020070 06 439 A1 | 9/2007 | |
| DE | 1020080 09 704 A1 | 8/2009 | |
| DE | 102008009704 A1 * | 8/2009 | ........... B08B 7/0042 |
| FR | 2595594 A1 | 9/1987 | |
| WO | WO-02/083451 A1 | 10/2002 | |
| WO | WO-2011/056923 A1 | 5/2011 | |

OTHER PUBLICATIONS

Tober, G. et al., "Qualitätssicherung durch Online—Prozessüberwachung an lasergeschweißten T-Stößen", DVS—Berichte 208, (2000), pp. 59-65, ISBN-Nr. 3-87155-666-1.
International search report received in connection with international application No. PCT/EP2011/069012; dated Feb. 2, 2012.
Dr. Holger Gruss; "Schweißgerechte Struktur- und Prozessstrategien im Flugzeugbau", 2008, Dresden; Article with English translation of Abstract.

* cited by examiner

METHOD AND DEVICE FOR PRODUCING A SLIDING RAIL OF A LONGITUDINAL ADJUSTMENT DEVICE OF A VEHICLE SEAT

CROSS REFERENCE TO RELATED APPLICATIONS

The present application is a National Stage of International Application No. PCT/EP2011/069012 filed on Oct. 28, 2011, which claims the benefit of German Patent Application No. 10 2010 061 800.4 filed on Nov. 23, 2010, the entire disclosures of which are incorporated herein by reference.

The invention relates to a method for producing a sliding rail of a longitudinal adjustment device for a vehicle seat, wherein the longitudinal adjustment device comprises at least one pair of rails with two sliding rails and with sliding and/or rolling elements, the two sliding rails are displaceable relative to each other in their longitudinal direction, the sliding and/or rolling elements are disposed between the sliding rails, and the sliding rails have contact tracks with which the sliding and/or rolling elements are in contact, the method comprising the following method steps: a) producing a sliding rail, and b) painting the sliding rail, as well as to a device for carrying out this method.

Such a method and such a device for carrying out this method are known from practice. With regard to the prior art, reference is made to DE 10 2007 006 439 A1, DE 10 2004 061 140 A1, DE 198 12 045 A1, U.S. Pat. No. 6,059,248 A1, U.S. Pat. No. 4,863,289 A1, DE 31 43 431 A1 and DE 195 21 566 A1.

A longitudinal adjustment device located underneath a motor vehicle seat usually comprises two pairs of rails with two sliding rails each. The sliding rails are referred to as floor rail and seat rail. They rest against each other via sliding and/or rolling elements and are displaceable relative to each other in the longitudinal direction of the rails. The production of sliding rails of this kind takes place, for example, in several forming steps starting with a steel sheet blank. Sliding rails produced from light metal, for example aluminum, also exist, see DE 69 223 258 T2 and DE 100 14 154 C1. After all forming steps of the production have been completed and the metallically bright rail is provided, the latter is painted. Prior to the painting step, a step of applying a primary coating paint, i.e. a primer, can take place. Usually, a phosphatizing process takes place. It is only then that the pair of rails is assembled.

The paint layer protects the rail profiles, particularly against rust. Phosphatizing also has a corresponding effect. The paint layer gives the sliding rail a uniform appearance; black paint is generally used for painting.

The terms painting and paint are understood to mean all possible methods for coloring and/or coating and/or covering with a layer. The paint can have any color; it can also be transparent. The paint covers all surfaces of the sliding rail. It thus also covers the contact tracks for the sliding and/or rolling elements. Plastic bars, coatings, balls, rolling elements in a drum or roller form or the like are used as sliding and/or guiding elements.

Particularly when using rolling elements, for example rollers, but also when using balls, cones or drums, it is necessary to render the pair of rails capable of moving. In a run-in process, the one sliding rail is displaced back and forth relative to the other one. It is only then that running behavior becomes acceptable.

Paint particles chip off during this run-in process. This chipping leads to the contact tracks being overlaid by the chipped-off paint particles. They are thus dirty. The running behavior of the longitudinal adjustment device is affected thereby. The paint particles chip off in an uncontrolled manner so that no precisely delimited metallic contact tracks are provided. Advantageously, the run-in process takes place with pairs of rails under load, for example a weight load. This leads to an improved removal of the paint particles.

In the method according to the prior art, a precise contact track cannot be obtained. Residual paint particles affect the running behavior. The paint particles typically have a thickness of 2/100 mm; they are noticeable in practical operation.

This is where the invention comes in. It has set itself the object of providing an improved method and corresponding device with which the removal of the paint layer from the contact tracks is simplified in order thus to improve the running behavior permanently.

This object is accomplished by a method having the features of claim 1. It is furthermore accomplished by a device having the features of claim 8.

The invention has several advantages. A run-in process, particularly rendering the longitudinal guide capable of moving, is now no longer necessary. The longitudinal guide has a comfortable running behavior from the outset. The contact tracks are no longer being soiled; they are metallically bright. They can be greased easily. In this case, the chipped off material does not affect the greasing process.

The power of the laser is selected in such a way that only the paint layer is burnt off or removed. For this purpose, lasers with a power of less than 100 watts, e.g. between 20 to 80 watts, are sufficient. However, more powerful lasers (e.g. 1-5 kW) can also be used; they offer the advantage that the laser beam can be guided over the entire contact track in a shorter space of time. The laser beam is moved over the entire contact track by suitable means, e.g. movable deflecting mirrors. This preferably happens in a continuous manner. The laser beam remains at one location on the contact track only for so long as is necessary for removing the paint layer. The laser can be guided along the contact track over different paths; for example, it can be guided in the longitudinal direction of the contact track. In the process, it can oscillate transversely to it, run around it in a circular manner, or the like.

Preferably, a laser with a wavelength is chosen that is absorbed particularly well by the paint. It is known that paint layers exhibit a different absorption behavior over the wavelength. Of the possible lasers, a suitable and also opportune laser is selected which, with its wavelength, matches the absorption maximum of the paint as closely as possible.

When the paint layer is removed, vapors can be produced; it is advantageous to draw these vapors away via suitable suction devices, for example to withdraw them by suction. This can be done by means of an suction hood.

When the laser layer is burnt off, charred residues can remain on the contact track; it is advantageous to wipe them away by means of a wiping means or another cleaning method.

In the device working in accordance with the method, a laser is used according to the invention, which removes the paint layer on the contact track by sweeping over the contact track. Preferably, positioning devices and/or detection devices are used which permit an automatic recognition of the position of the contact track and allow the laser to be oriented exactly towards the contact track. For this purpose, it can be helpful to provide certain markings on the sliding rail, which are easily detectable by machines. For example, stops that are present anyway and which are provided at the ends of the contact track can be used for this purpose. They prevent the sliding and/or rolling elements from being able to escape from the space between the two sliding rails. Such detection devices can be operated, for example, optically. In this connection, reference is made only by way of example to the dissertation "Schweißgerechte Struktur- and Prozessstrategien im Flugzeugbau" Dr. Holger Gruss, 2008, Dresden and the German article "Qualitätssicherung durch Online-Prozessüberwachung an lasergeschweißten T-Stößen", G. Tober and A. Henrich, DVS—Berichte 208, ISBN-Nr. 3-87155-666-1, pages 59 to 65, 2000.

In practical tests, it was now found, surprisingly, that it is also possible to selectively harden only the contact track by exposition to the laser. It is possible to choose the power of the laser in such a way that only the paint layer is removed and the underlying metallic surface virtually does not become warm, at most maximally 50° warmer, in particular maximally 20° warmer. However, a higher laser power can also be used and the material of the contact track can be deliberately heated up to such an extent that a hardening process sets in. A laser hardening process is described, for example, in U.S. Pat. No. 4,304,978 A and U.S. Pat. No. 6,772,041 B2 and the literature cited therein. Selected regions of the contact tracks can be heated by the laser beam and a desired hardening can be achieved thereby. Since only small regions are heated at any one time, they are able to cool off rapidly. Therefore, quenching is most frequently unnecessary.

The method according to the invention has proved itself very much particularly as a combination of the removal of the paint layer and hardening of only the contact track. However, it can also be carried out in such a way that both processes, the removal of the paint layer and the hardening process, are carried out by means of separate laser treatments. In this regard, the invention also relates to a method for producing a sliding rail of a longitudinal adjustment device for a vehicle seat, wherein the longitudinal adjustment device comprises at least one pair of rails with two sliding rails and with sliding and/or rolling elements, the two sliding rails are displaceable relative to each other in their longitudinal direction, the sliding and/or rolling elements are disposed between the sliding rails, and the sliding rails have contact tracks with which the sliding and/or rolling elements are in contact, the method comprising the method step of producing a sliding rail, and is characterized in that, subsequent to production, at least one contact track is irradiated with a laser and a hardening of the material of the contact track is thus accomplished. The invention also relates to a device for laser hardening the contact track.

The applicants reserve the right to combine any features and also partial features from individual sentences and/or individual features or also sub-features of the claims with one another in any way, even if such a combination has not been specifically indicated. Any possible combination of indicated features can be taken into account.

Figure 2:
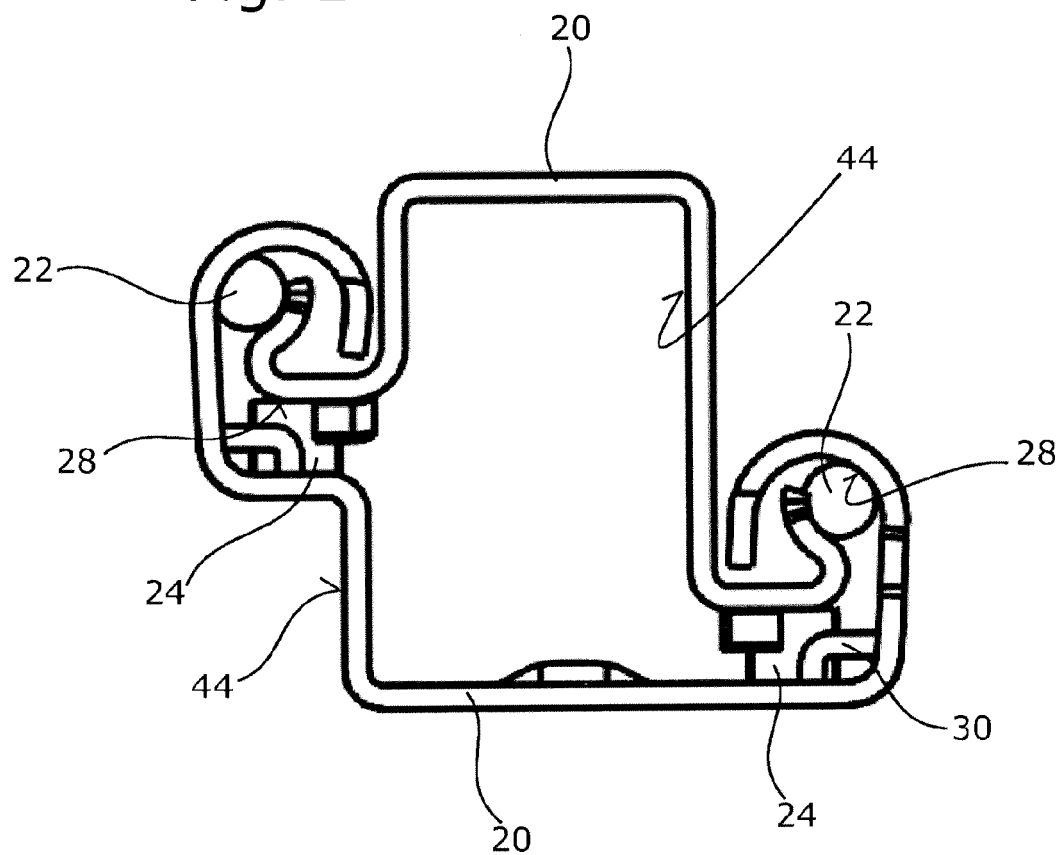
Figure 3:
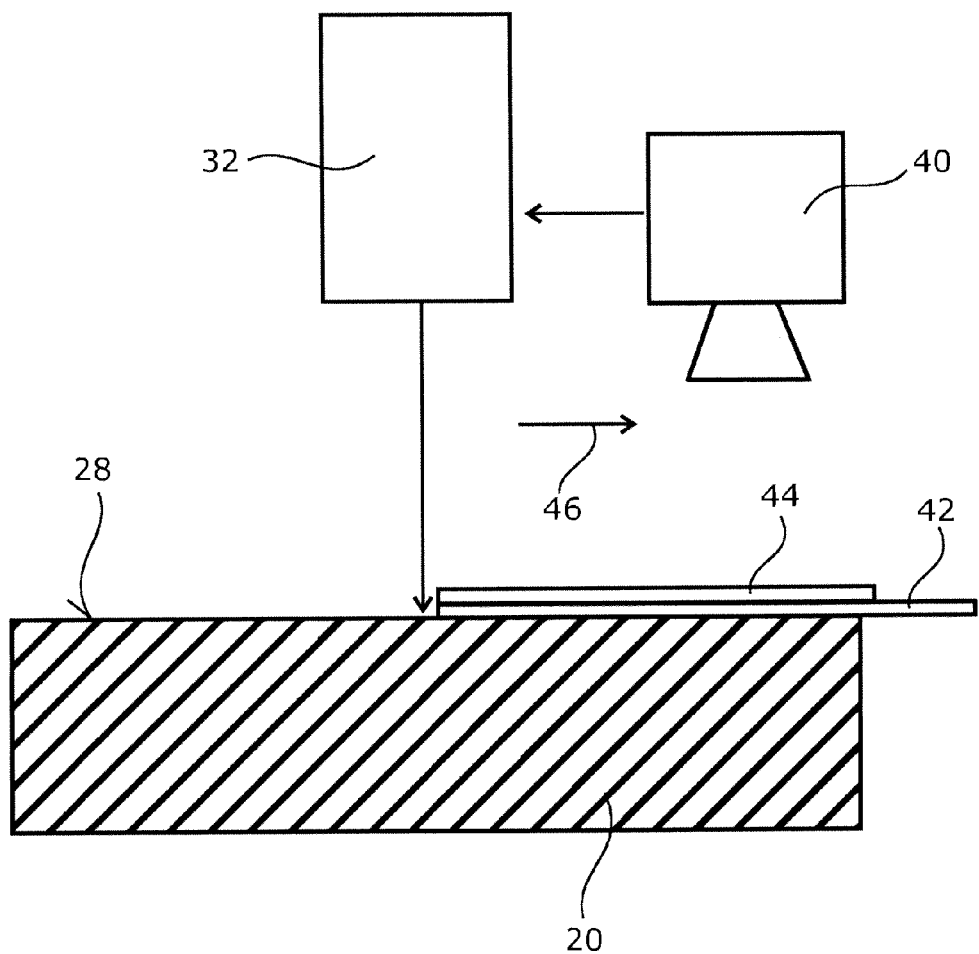
Figure 4:
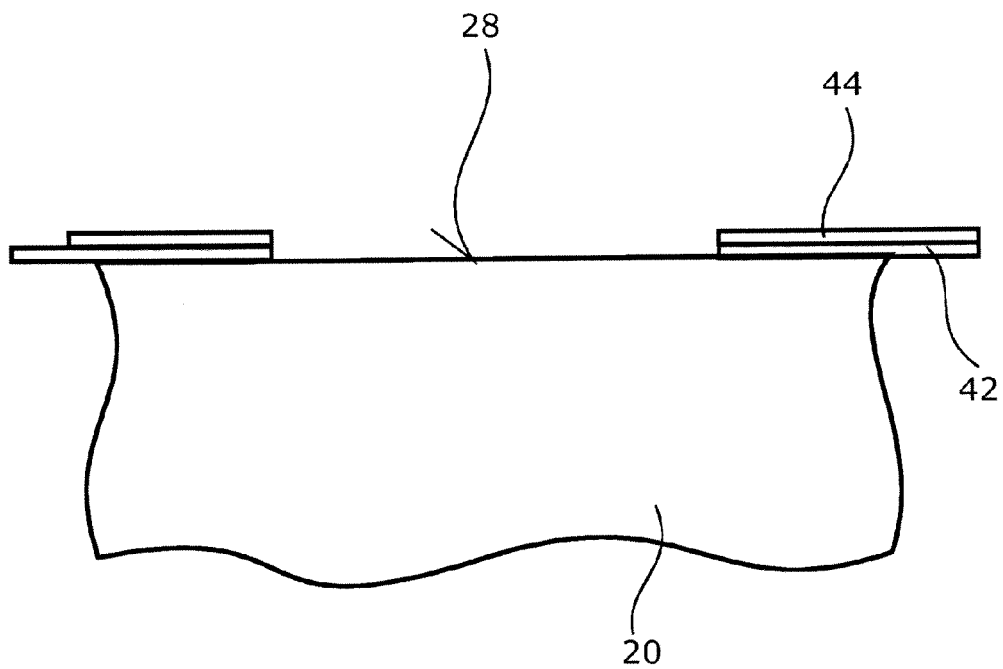
Figure 5:
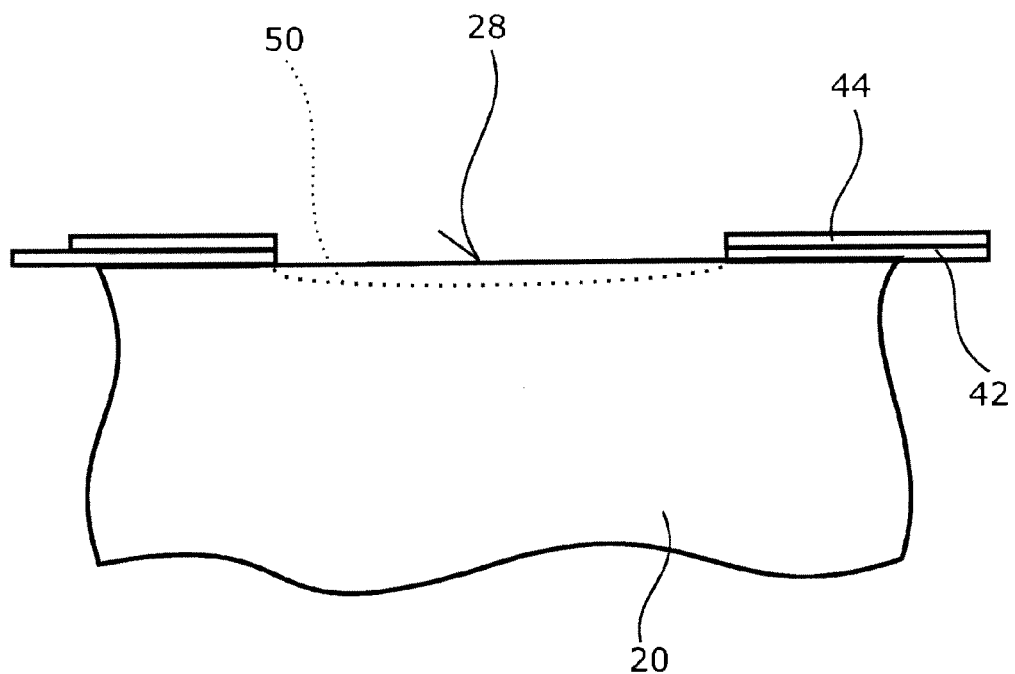

Other advantages and features of the invention become apparent from the dependent claims as well as from the following description of exemplary embodiments of the invention, which are to be understood not to be limiting and which will be explained below with reference to the drawing. In the drawing:

FIG. 1: shows a perspective view of a sliding rail with a laser and a suction device, FIG. 2: shows a frontal view of a pair of rails, FIG. 3: shows a basic representation of a laser, a positioning device and, in a cross-sectional side view, of a sliding rail, FIG. 4: shows a basic representation in a cross-sectional transverse view of a sliding rail, and FIG. 5: shows a basic representation as in FIG. 4, but now with a hardened layer.

In the method according to the invention, a sliding rail 20 is produced first from metal, e.g. from a blank of steel sheet. In an alternative, the sliding rail 20 is produced from light metal. The sliding rail 20 can be a floor rail or a seat rail. After production, it is, in principle, fit for use and could therefore be fitted into a motor vehicle. However, it is first iron-phophatized and, in a further step, painted. It is then provided in a form as it is suitable, according to the prior art, for assembly with another sliding rail (see FIG. 2) and guide means in the form of rolling elements, which in FIG. 2 are configured as balls 22 and rollers 24, to form a pair of rails. Such a pair of rails is shown in FIG. 2. The seat rail is shown at the top of FIG. 2, the floor rail at the bottom.

The sliding rail according to FIG. 1 has several holes 26 which serve for different tasks, for example for the attachment of the sliding rail 20 to a vehicle underbody or to a base frame of a seat. It furthermore comprises two contact tracks 28 which extend over virtually the entire length of the rail. In this direction, the sliding rails of a pair of rails are also displaceable relative to one another. Stops 30 are located at the end of each contact track 28. They limit the path of the balls 22 or rollers 24.

A right-handed x-y-z coordinate system is used for the description. The x axis extends in the longitudinal direction of the sliding rail 20. The y axis lies in the horizontal; it forms a horizontal plane together with the x axis. The z axis extends vertically upwards.

As FIG. 1 shows, a laser 32 is directed towards the contact track 28. Its focal spot 34 is substantially elliptical; it has the approximate width of the contact track 28 as the major axis of the ellipse and a minor axis in one direction of movement 46, i.e. in the direction of the contact track 28. It is moved in the longitudinal direction of the contact track 28; in FIG. 2, this is a vertical to the paper plane. The direction of movement 46 is identical to the direction of the x axis. Preferably, the elliptical focal spot 34 has a major axis which corresponds to 100 to 140% of the width of the contact track 28. Preferably, the elliptical focal spot 34 has a minor axis of the ellipsis which is less than 50%, preferably less than 30% of the major axis of the ellipsis.

A suction means in the form of a tube 36 is located in the immediate vicinity of the focal spot 34. Air is withdrawn by suction in the direction of the arrow 38. It is advantageous to connect to the front end of the tube 36 a hood or the like, which reaches over the contact track 28 and has a hole for the passage of the laser beam. Due to the high speed with which the laser beam is moved, it is advantageous if the suction means has an entry slot which has the length of the entire contact track 28. In that case, the tube 36 does not have to be moved with it. A hood can be designed accordingly, which extends over the entire length of the contact track 28 and which has a window that substantially has the length of the contact track and through which the beam of the laser 32 can pass.

The pair of rails according to FIG. 2 has a total of four contact tracks 28 per sliding rail 20. All of these contact tracks are freed from paint by laser.

The phosphate layer 42 does not necessarily also have to be removed with the laser 32. If a rather soft material, which possibly also has lubricating properties, is selected as the phosphate layer 42, then this layer can remain. The removal of the paint layer 44 is necessary because it is brittle and, according to the prior art, breaks down into fragments which constitute an interference.

FIG. 3 shows a section in the plane y-z. It shows the cooperation of a laser 32 with a positioning device 40. The latter detects the position of the contact track 28. This is done, for example, optically, via a video image and image recognition. The stops 30, for example, are detected in the process. The laser 32 is oriented by the positioning device 40 in such a way that it moves along the area between these stops 30; the contact track 28 is burnt free in this manner. Then, a lubricant, for example grease, is applied to it. The latter protects it against rust.

FIG. 4 shows a section in the plane y-z. It shows a contact track 28 of a sliding rail 20 that is otherwise not shown in any more detail. The contact track 28 is covered with a phosphate layer 42; the latter extends over the entire metallic surface of the sliding rail 20. A paint layer 44 is located on the phosphate layer 42. The former also extends over the entire surface of the sliding rail 20. It extends over the entire surface covered by the phosphate layer 42. It is applied by, for example, electrophoretic dip painting and burnt in at a low baking temperature, for example 150° C. The layer thickness can be in the range of from 15 to 17 micrometers. The product Aqua-EC 3000 by the company Dupont is used, for example.

It can be seen in FIG. 4 that the paint layer 44 above the contact track 28 is now removed. This also applies to the phosphate layer 42 at the location concerned. Laterally (in the y direction) of the contact track 28, both layers 42, 44 are still in existence.

FIG. 5 shows the state after a laser treatment that was carried out with a higher-power laser 32. Not only the phosphate layer 42 and the paint layer 44 are burnt off with the laser 32; superficial regions of the metal of the sliding rail 20 are also heated to high temperatures. These regions are able to cool off very rapidly due to thermal conduction. A hardening process takes place, as it is described in more detail, for example, in the above-mentioned US patent specification. FIG. 5 shows a hardened layer 50 which extends underneath the surface and is relatively thin. It provides the contact track 28 with a greater hardness or, on the whole, more favorable properties. Thus, the contact track 28 is suitable, in particular, for loads from rollers, balls or the like.

The invention claimed is:

1. A method for producing a sliding rail of a longitudinal adjustment device for a vehicle seat, wherein the longitudinal adjustment device comprises at least one pair of sliding rails with sliding and/or rolling elements, the sliding rails are displaceable relative to each other in their longitudinal direction, the sliding and/or rolling elements are disposed between the sliding rails, and the sliding rails have contact tracks with which the sliding and/or rolling elements are in contact, the method comprising:
producing the sliding rail;
painting the sliding rail;
subsequent to the painting step and before assembling the sliding rail with another sliding rail, irradiating with a laser at least one contact track and thereby, a paint layer situated on the contact track is removed by the laser; and,
subsequent to the irradiating with a laser step and before assembling the sliding rail with another sliding rail, applying a lubricant to the contact track.

2. The method according to claim 1, wherein the laser is guided over the contact track in the longitudinal direction of the contact track.

3. The method according to claim 1, wherein the laser is guided over the contact track in one direction of movement and is moved back and forth over the contact track in another direction of movement.

4. The method according to claim 1, wherein the laser emits laser light having a wavelength that is absorbed in the paint layer.

5. The method according to claim 1, wherein a suction device is furthermore provided which withdraws vapors produced when the paint layer is being burnt off.

6. The method according to claim 1, wherein a detection device and/or positioning device is provided which recognizes the position of the painted contact track and which controls the laser in such a way that the laser only hits the painted contact track.

7. The method according to claim 1, wherein the sliding rail is produced first from a blank of steel sheet.

8. The method according to claim 1, wherein, subsequent to the producing of the sliding rail and before the painting the sliding rail, the contact track is covered with a phosphate layer, wherein the painting the sliding rail provides the paint layer on top of the phosphate layer.

9. The method according to claim 8, wherein the paint layer is removed by the laser.

10. The method according to claim 8, wherein the phosphate layer is not removed by the laser.

* * * * *